Nov. 4, 1941.                A. W. DE SART, SR                2,261,541
                               MEASURING SYSTEM
                             Filed April 11, 1939        2 Sheets-Sheet 1
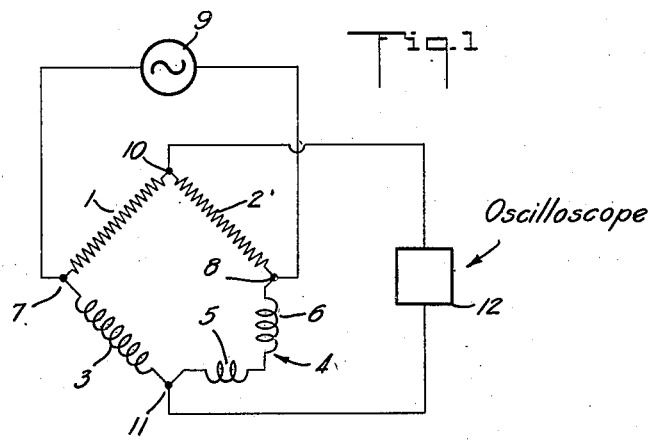
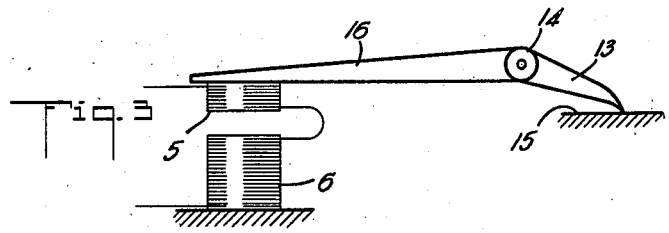
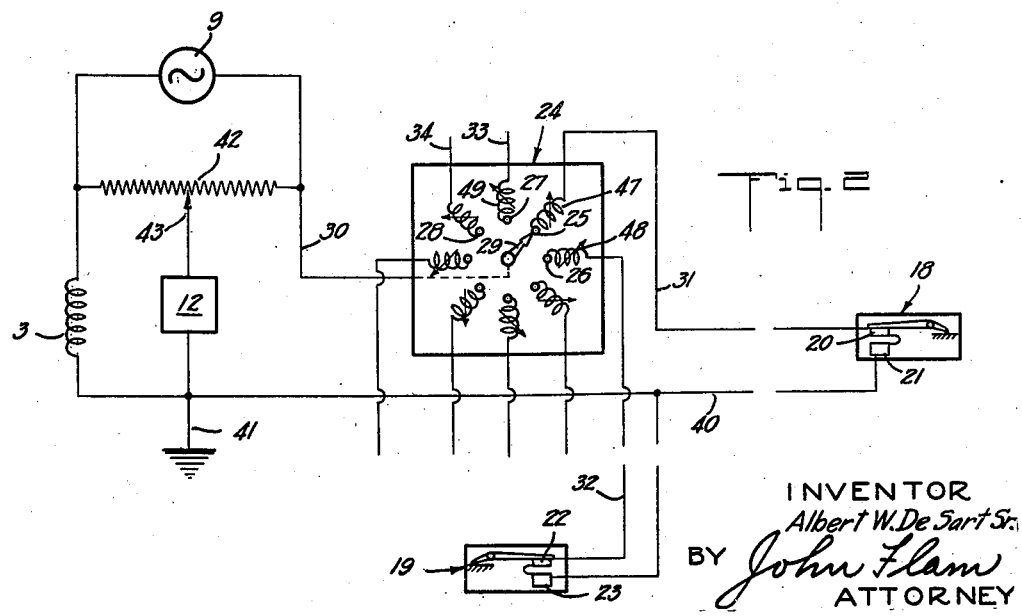
INVENTOR
Albert W. De Sart Sr.
BY John Flam
ATTORNEY

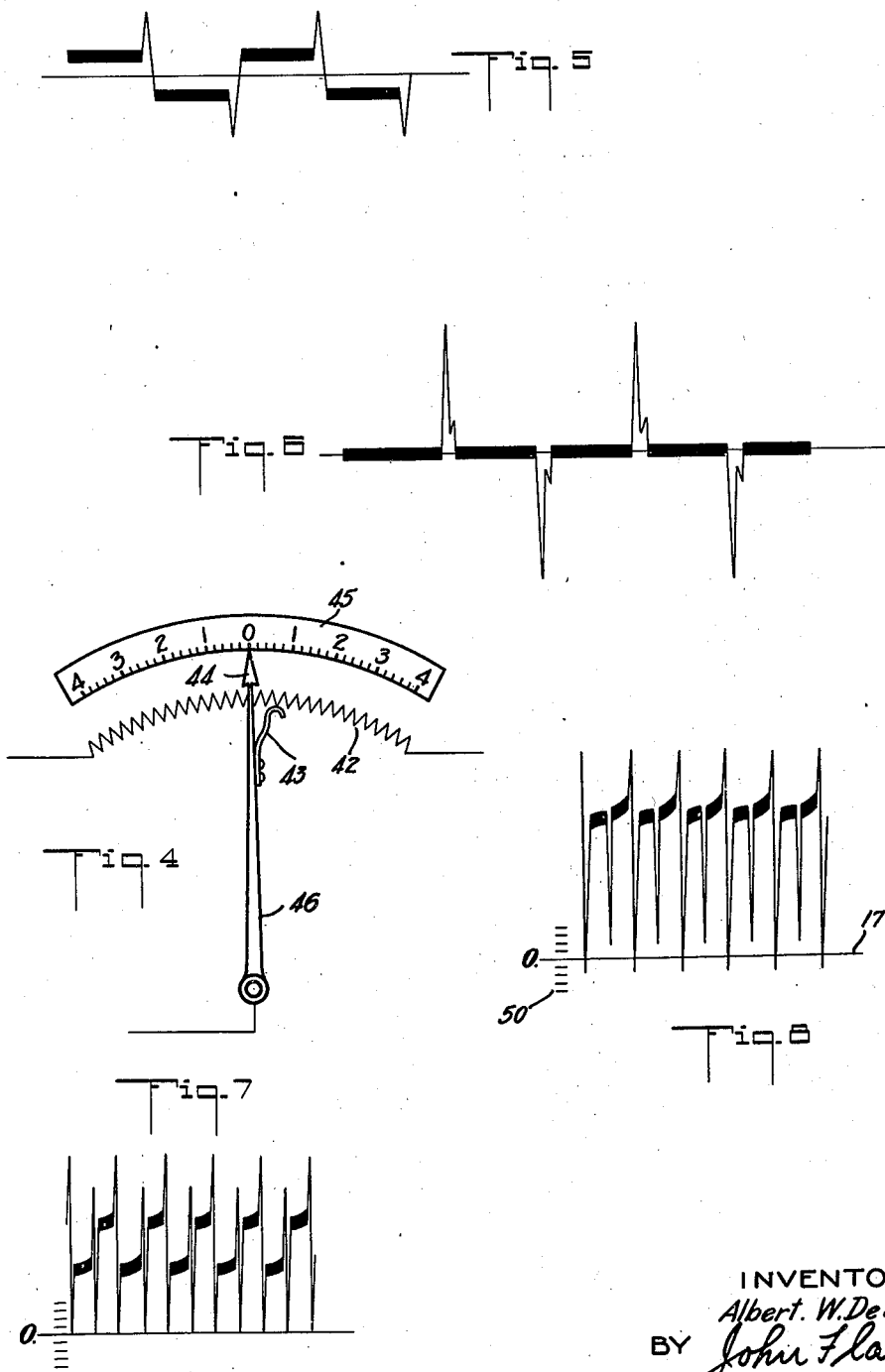

Patented Nov. 4, 1941

2,261,541

UNITED STATES PATENT OFFICE 2,261,541

MEASURING SYSTEM

Albert W. De Sart, Sr., Los Angeles, Calif.

Application April 11, 1939, Serial No. 267,354

4 Claims. (Cl. 177—351)

This invention relates to a system for measuring or detecting minute linear quantities, especially such as the amount of strain of members under load.

It is of great importance in the testing of structures, to obtain accurate data regarding the behavior of the structure under different load conditions. Examples of such structures are oil well devices, airplanes, dirigibles, vehicles, etc. where it is especially difficult or impossible to have access to the parts of the structure under investigation. Thus in testing airplane fusilages or wings, it is necessary to obtain data regarding the strain at points within these structures, said strain occurring during flight under varying conidtions, or while the motive power is in operation.

Such testing of strain, when properly accomplished on experimental structures, would of course enable the constructor to correct the design, the weak spots being thus predetermined without serious hazards of accidents and loss of life that are all too common in this field.

It is accordingly one of the objects of this invention to make it possible to test the behavior of structures at places normally inaccessible to an observer.

It is another object of this invention to provide positive and readily measurable indications of the intensities of the stresses and strain in a simple manner.

Even after an airplane or other structure is put into normal service, the measuring system may be utilized by the operator to indicate whether he is improperly or excessively loading the structure, as by too fast flight, or acceleration or deceleration, or by banking, diving, pulling out of power dives, etc., and to warn him that he is operating the structure in an unsafe manner. It is thus still another object of this invention to make it possible for an operator to obtain these indications.

These objects are accomplished by the aid of an electric circuit in the form of a bridge. This bridge is purposely so designed that the least imbalance of the bridge produced by the strain to be tested, causes a very pronounced and measurable reaction on the current flow in a circuit associated with the bridge. The measurement may be made either by noting the effect of the imbalance, or by noting the degree of correction required to bring the bridge back to a normal or balanced condition. It is another object of this invention to make it possible to obtain these effects.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a schematic diagram illustrating the principles of the invention;

Fig. 2 is a diagram similar to Fig. 1, showing a practical embodiment of the invention;

Fig. 3 is an enlarged detail diagram of an apparatus utilized for varying the impedance of one arm of the bridge circuit;

Fig. 4 is a diagram illustrating the manner in which the impedances of other arms of the bridge circuit may be adjusted, together with an indicator utilized in connection therewith;

Fig. 5 is a diagrammatic representation of a wave form of current that may be utilized as a normal current form observed by the aid of the apparatus;

Fig. 6 illustrates the wave form that may be observed upon departure of the bridge circuit from normal condition;

Fig. 7 is a diagram illustrating another normal wave form that may be utilized; and Fig. 8 illustrates the wave form of current that may be obtained upon disturbances of the bridge in which the normal wave form shown in Fig. 7 is produced.

In the present instance the four impedance arms of the bridge circuit are diagrammatically illustrated in Figure 1. Two of these arms, such as 1 and 2, may be plain resistances; the third arm 3 may be a coil of fixed inductance. The fourth arm 4 is indicated in the present instance as comprising a pair of inductance coils 5 and 6 having relative movement with respect to each other, so as to vary the inductance of the arm 4.

Across the diagonal points 7 and 8 of the bridge a source of alternating current and an amplifier is connected. This source and amplifier is diagrammatically illustrated by symbol 9. The source is such as to produce an alternating current of frequencies of several hundred or the like, in which the wave forms depart sharply from a true sine wave. This effect may be obtained in any well known manner; such as by overloading any of the elements of the bridge circuit, or by synthesis of a component fundamental with appropriate harmonics.

Across the other diagonal points 10 and 11 of the bridge circuit there is connected an indicator in the form of an oscilloscope 12. This oscilloscope may be used for observation of the wave form of current passing through the oscilloscope 12. Since, as is well understood an oscilloscope operates without material current drain, the wave form may be indicative of electro-motive force.

It has been observed that even very minute relative movements of the coils 5 and 6 produce an extensive and magnified disturbance of the wave form. For example, the normal wave form may be such as illustrated in Fig. 5. Upon the least movement between coils 5 and 6, the wave form assumes a shape considerably divergent from the shape of Fig. 5. An example of such a variation in wave form is illustrated in Fig. 6. The major peaks are much higher and farther apart vertically; and intermediate peaks of reduced size may appear. The variation in the height of the peaks may be taken as an indication of the degree of unbalance over the normal condition.

Relative movement of the coils 5 and 6 may be accomplished by the aid of multiplying levers. For example, in Fig. 3 a magnifying micrometer arrangement is illustrated. In this case the short arm 13 of a lever 14 may be placed in contact with a surface 15 of an element which may be subjected to vibration or stress. The long arm 16 of the lever 14 is shown as carrying the small coil 5 cooperating with the stationary coil 6. As the member having the surface 15 vibrates or is stressed, the total inductance of the two coils 5 and 6 is correspondingly varied. This consequently produces the magnified effects in the wave form of the current flowing in the oscilloscope circuit. Some preliminary adjustment may be advisable in the bridge circuit, to obtain optimum effects. Normally the resistances 1 and 2 may have a combined value of about 500 to 1000 ohms; and the electro-motive force may be of the order of several hundred volts. The oscillator 9 with its associated amplifier may be operated in the neighborhood of 500 cycles.

All of the major peaks of the wave form in the normal shape of Fig. 5 are about the same height; in Fig. 6, corresponding to the disturbance occasioned by vibration or movement of the coil 5 with respect to coil 6, the peaks are subdivided into major and minor peaks. The minor peaks have a smaller amplitude than the normal peaks of Fig. 5; and the major peaks of Fig. 6 are much larger in amplitude than the normal peaks of Fig. 5. These effects can be measured by the aid of appropriate scales, the variation in the heights of the peaks being a direct indication of the extent of movement of the coil 5 with respect to coil 6, either under stress or under vibration.

It is not essential that the exact form of waves shown in Figs. 5 and 6 be utilized. The normal waves may take the form for example, as illustrated in Fig. 7, in which the line 17 may be taken as the null indicating line. This line may be drawn about half way between the high and low peaks. Upon a disturbance of the bridge by movement of coil 5 with respect to coil 6, the relative heights of these peaks may be very materially altered. Such a condition is shown in Fig. 8. Measurement of the difference in relative heights of the peaks will serve as a measurement of the function being measured by the system. Appropriate scale marks as indicated by 50 may be provided if desired to aid in such measurement.

A practical form of system is illustrated in Figs. 2 and 4. In this system it is possible optionally to utilize for the arm 4 of the bridge, any one of a number of alternative impedances, so located that stress effects at different localities may be measured. For example, there may be various places, as many as twenty or more, in a structure, such as the wings and tail of an airplane, that should be tested. In each of such locations there is permanently located a pair of relatively movable inductance coils. Thus, an assembly such as illustrated in Fig. 3, and indicated by the numeral 18 may be mounted adjacent a critical point in the wing structure, a similar assembly 19 being mounted for example to determine the stress at a critical point in the tail structure. Other such assemblies may be mounted at other points where it is desired to determine the stress. These assemblies each include a pair of relatively movable inductance coils, the coils in assembly 19 being indicated by 22 and 23. To make possible the connection of any desired pair of these coils in the bridge circuit, a switch generally indicated by 24 is provided. This switch is located at a central observing station, such as the cockpit of a plane. As shown, switch 24 comprises any suitable number of contacts 25, 26, 27, 28, etc., (eight being shown by way of example) arranged to be optionally contacted by a rotatable switch arm 29. This arm is connected to the bridge circuit by lead 30. One side of each pair of relatively movable coils is connected to one of the switch contacts; thus the coils of assembly 18 are connected to contact 25 by lead 31, the coils of assembly 19 are connected to contact 26 by lead 32. As many of the other contacts 27, 28, etc. as required may be similarly connected by leads 33, 34, etc. to other coil assemblies. As many of the contacts may be used as desired.

The other side of each pair of coils 20—21, 22—23, is connected to a common lead 40 which returns to the bridge circuit and may be grounded, as at 41.

In this form of the invention, the oscillator 9 is shown as connected across a resistance 42 having a movable tap 43 forming an adjustable diagonal point of the bridge. The movable tap 43 serves to divide the resistance 42 into component resistances corresponding to the resistances 1 and 2 of Fig. 1. In other respects the system of Fig. 2 is quite similar to the system of Fig. 1.

The arrangement may be such that movement of tap 43 (Fig. 4) causes corresponding movement of a pointer 44 over an arcuate scale 45, calibrated to indicate a deviation from normal conditions. This movement may be accomplished by means of suitable gearing if desired.

In this form of the invention, the indication may be obtained by moving the switch arm 29 to bring the desired set of coils into the bridge circuit. In order to bring the circuit into balance for normal condition and zero setting of tap 43, adjusted inductances 47, 48, 49, etc. are interposed in each of the circuits. These may be conveniently incorporated in the switch assembly 24. This makes it possible to compensate for variations between the different pairs of coils, as well as for differences in the electrical characteristics or lengths of the connections to them.

With the circuits from the indicating assemblies properly balanced, tap 43 at the zero setting and no strain at the points where the indicating assemblies 18, 19, etc. are placed, there will be no deviation of the wave form from normal. However, when strain occurs at the assembly which has been switched into the bridge circuit by switch 24, there will be variation of the wave form. The amount of this variation is an indication of the amount of strain, and hence of the stress. Instead of noting the variation of wave form as an indication of the extent of the strain, the tap 43 may be moved by means of arm 46 until the normal wave form is reestablished. The position of pointer 44 on scale 45 will then indicate the amount of distortion and hence the strain. By appropriate calibration of the scale, this indication may be directly the amount of stress. It has been found that even a variation of one one-thousandth of an inch in the spacing of the pair of coils forming the variable impedances will produce a very large deviation of the wave form from normal, and will require a large movement of the tap 43 to bring the wave form back to normal shape.

What is claimed is:

1. In a system for measuring relative mechanical displacement, a bridge circuit, a source, including a circuit, connected across a diagonal of the bridge circuit and providing a current of sharply peaked wave form through the arms of said bridge for all degrees of mechanical displacement within the limits of the system, means for indicating the wave form, and connected across the other diagonal of the bridge circuit, means for adjusting the bridge circuit to cause the wave form to assume a pattern corresponding to a definite beginning point of the mechanical displacement, and means responsive to said mechanical displacement for varying the electrical characteristics of one of the arms of the bridge, whereby the wave form is markedly altered from said pattern, said means for varying the electrical characteristics comprising a member moved in response to said displacement for varying the impedance of said arm.

2. In a system for measuring relative mechanical displacement, a bridge circuit, a source, including a circuit, connected across a diagonal of the bridge circuit and providing a current of sharply peaked wave form through the arms of said bridge for all degrees of mechanical displacement within the limits of the system, means for indicating the wave form, and connected across the other diagonal of the bridge circuit, means for adjusting the bridge circuit to cause the wave form to assume a pattern corresponding to a definite beginning point of the mechanical displacement, and means responsive to said mechanical displacement for varying the electrical characteristics of one of the arms of the bridge, whereby the wave form is markedly altered from said pattern, said means for varying the electrical characteristics comprising an inductance in said arm, and means for varying said inductance in accordance with the extent of said displacement.

3. In a system for measuring relative mechanical displacement, a bridge circuit, a source, including a circuit, cooperating with the bridge circuit and providing a current of sharply peaked wave form through the arms of said bridge for all degrees of mechanical displacement within the limits of the system, means for indicating the wave form, means for adjusting the bridge when the mechanical displacement is at a definite beginning point, the crests of said wave having a definite position when the bridge is thus adjusted, means whereby variations in said mechanical displacement disturbs the adjustment, the extent of disturbance being a function of the displacement, the crests of the wave being displaced by said disturbances, the crests of the wave serving as indicating points giving by their position a substantially true indication of the extent of the displacement.

4. In a system for measuring mechanical displacement, a bridge circuit, a source, including a circuit, cooperating with the bridge circuit and providing a current of sharply peaked wave form through the arms of the bridge for all degrees of mechanical displacement within the limits of the system, means for indicating the wave form, means for adjusting the bridge when the mechanical displacement is at a definite beginning point, the crests of said wave having a definite position when the bridge is thus adjusted, a member moved in response to said mechanical displacement for varying the impedance of one arm of the bridge, and causing a marked change in the position and character of the crests of said wave.

ALBERT W. DE SART, Sr.